Patented July 3, 1923.

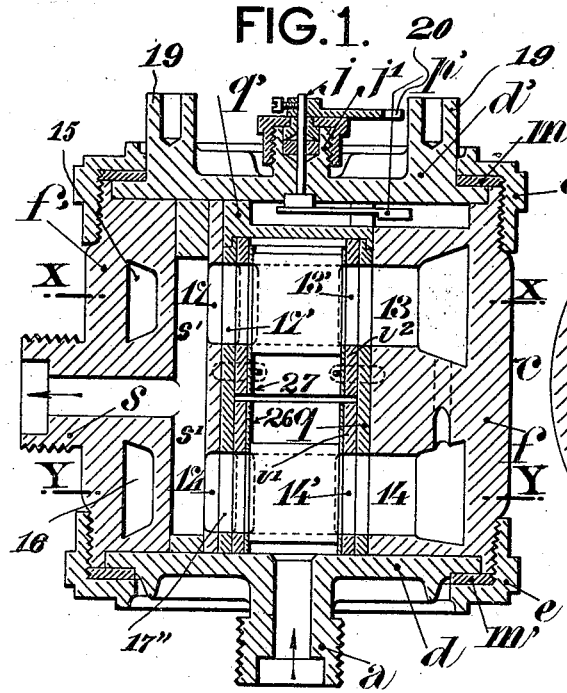

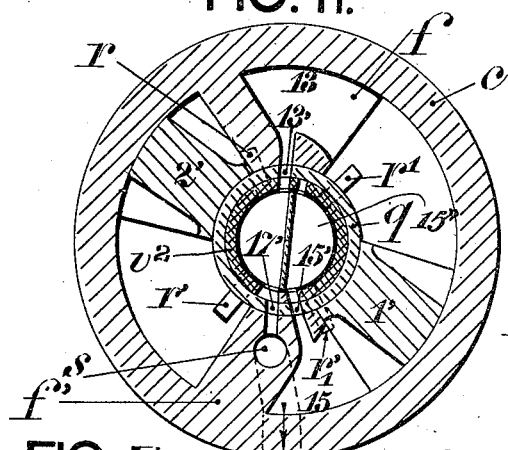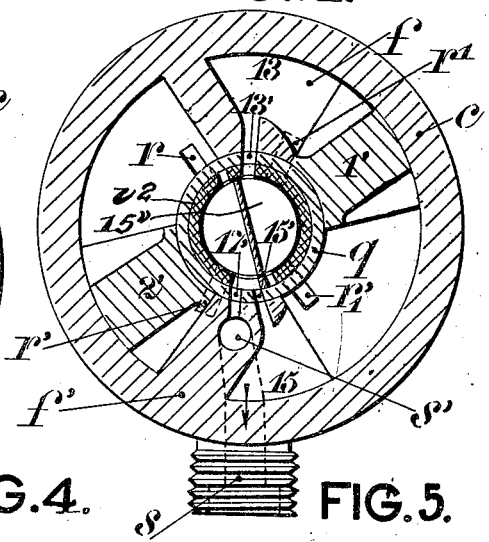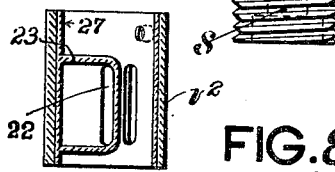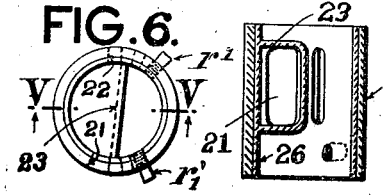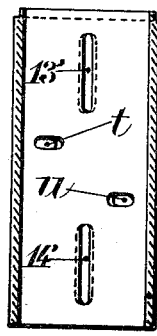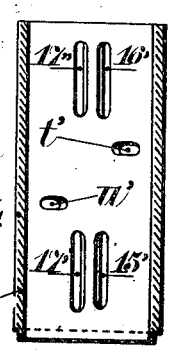

1,460,880

UNITED STATES PATENT OFFICE.

BENJAMIN ADOLPHE ARNAUD, OF LYON, FRANCE, ASSIGNOR TO SOCIÉTÉ LYONNAISE DE COMPTEURS DE'EAU, OF LYON, FRANCE.

WATER METER.

Application filed August 31, 1920. Serial No. 407,090.

*To all whom it may concern:*

Be it known that I, BENJAMIN ADOLPHE ARNAUD, a citizen of the French Republic, of Lyon, France, have invented certain new and useful Improvements in Water Meters, of which the following is a specification.

The improved meter comprises a cylindrical casing provided with inlet and outlet pipes for the liquid and fixed within this casing is a body comprising two solid masses each of which has the shape of a sector of a cylinder these two sectors being provided with passages for the flow of the liquid and having between them a space co-axial with the casing in which space two oscillatory superposed valves are housed said valves being provided with wings movable in diametrically opposite chambers for measuring the liquid. The oscillations of the valves are communicated to suitable recording mechanism whereby the amount of liquid passing through the device is indicated.

The accompanying drawings illustrate the invention.

Fig. 1 is a central vertical section of the meter, the oscillating valve plates 1' 2' being removed for the purpose of simplifying the drawing.

Fig. 2 is a plan view, the top of the casing being removed.

Fig. 3 is a plan view of the distributor with the valves and tappets removed.

Fig. 4 is a section of the same along Z—Z facing the direction of the arrows.

Fig. 5 is a similar section facing in the opposite direction.

Fig. 6 is a plan view of one of the valves housed in the distributor.

Fig. 7 is a section along V—V facing the direction of the arrows.

Fig. 8 is a similar section facing in the opposite direction.

Fig. 9 is a side elevation of one of the oscillating valve-plates.

Fig. 10 is a view of the same in section along S—S.

Figs. 11 and 12 are sectional views along X—X of Fig. 9 where the valve-plates occupy an opposite position in each figure.

Figs. 13 and 14 are sectional views along Y—Y where the plates occupy an opposite position in each figure.

The meter comprises a casing $c$, constructed of bronze for example, which encloses the other members. This casing carries a tube S which constitutes the outlet for the liquid. The two ends of the casing are screw threaded and are recessed to receive the two end members, the faces of which are machined smooth. The end member $d$ carries a tube $a$ through which the liquid enters; the other end member $d^1$ has at its centre a boss $j^1$ forming a stuffing box for the passage of the rod $j$, which rod receives its movement from one of the oscillating plates of the meter by means of two levers $p^1$ and $n^1$. The end $d^1$ is provided with two further bosses 19 for the reception of screws for fixing a registering device of known kind and not illustrated. This registering device is operated by the lever 20 fixed to the rod $j$.

Tightness of the ends is assured by rubber washers $m^1$, $m^{11}$ compressed by the screw threaded crowns $e^1$ and $e$.

In the interior of the casing are soldered two sector shaped members $f$ and $f^1$ which are recessed to house the sleeve $q$, which lies in the exact centre of the apparatus.

In the sector shaped member $f$ are formed two channels 13 and 14 which communicate, the first with the orifice $13^1$, the second with the orifice $14^1$. In the sector shaped member $f^1$ are formed channels 15 and 16 which communicate with the orifices $15^1$ and $16^1$, also a collector channel $S^1$ which communicates with the orifices 17 and 17'' and with the outlet orifice S.

The distributing sleeve $q$ is provided with eight rectangular orifices (Figs. 4 and 5) and the position of this sleeve at the centre of the apparatus is such that these eight orifices correspond exactly and respectively with eight similar orifices formed in the sector shaped members $f$ and $f^1$.

The valves, which are all similar, are constituted by a metal cylinder with thin wall 26, 27 surrounded by a tube of ebonite $v^1$, $v^2$ having the same diameter as the inner diameter of the sleeve $q$. Each valve has four orifices; three of them have the same dimensions as those of the sleeve $q$; the fourth 21 is of the same width as the preceding but its length is three times greater to allow it to cause communication at the required moment of the coupled orifices of the sleeve which correspond to it.

Thus as shown in Figs. 6, 7 and 8 the large orifice 21 and the small orifice 22 which is opposite it on the same side of the axial plane, are separated and isolated from the rest of the valve by a partition 23.

The sleeve $q$ besides eight longitudinal orifices has four transverse orifices $t, u, t^1, u^1$ symmetrically arranged in pairs intended for the displacement of the tappets $r^1, r_1$ screwed on the valves, Fig. 6. It results that the two valves in the sleeve $q$ can be given by means of the tappets $r^1, r_1$ a movement of oscillation (the sleeve being fixed) capable of reversing the position of the orifice of said valve with respect to those of the sleeve $q$. It can further be seen (Fig. 1) that the sleeve $q$ is closed at one of its ends by a stopper $q^1$.

The operation is as follows:

The liquid arrives through the orifice $a$ (Fig 1), passes into the interior of the valves and constantly occupies the space formed by their two interior partitions. If the parts of the apparatus are considered in their initial position (Fig. 1) it can be seen that the liquid which occupies the space 15" passes into the passage which is offered, it being the orifices $15^1$ and the channel 15, and causes pressure on the corresponding face of the plate $l^1$. At the position occupied by this plate its other face is in communication with the exterior by the channel 13 the orifices $13^1$ and $17^1$ connected by the partitioning of the valve, the collector $S^1$ and the outlet orifice S.

The plate $l^1$ being movable in the hollow formed by the sectors $f$ and $f^1$ and closed at its two ends by the ends $d$ and $d^1$, nothing is opposed to the displacement of the plate $l^1$ in the direction of the thrust of the liquid. This plate will consequently occupy the position shown in Fig. 13.

In its displacement the plate $l^1$ meets towards the end of its stroke the tappet $r^1$, which is moved thereby and with it the valve $v^1$ on which it is screwed. The plate $l^1$ and its valve $v^1$ will thus occupy the position shown in Fig. 13.

As can be seen from this figure the liquid occupying the chamber $16^1$ of the valve $v^1$ passes through the orifices $14^1$, follows the channel 14 and causes pressure on the corresponding face of the plate $2^1$. The other face of this plate is in communication with the outside by the channel 16, the orifices $16^1$, the interior of the partitioning of the valve, the large orifice of this valve, the orifices $17''$, the orifice of the collector $S^1$ and the outlet S.

The plate $2^1$ will then occupy the position shown in Fig. 12. In its movement it will meet the tappet $r^1$ of the valve $v^2$ which now occupies a reverse position to its initial position (Fig. 11). At this new position the liquid which always occupies the space $15^1$ of the valve passes through the orifices $13^1$, the channel 13 and will cause pressure on the corresponding face of the plate $1'$.

The liquid which has previously displaced this latter plate and which occupies consequently all the space created by this displacement is driven out through the channel 15, the orifices $15^1, 17^1$, the collector channel $S^1$ and the outlet S. After this pulsation the plate $1'$ occupies the position indicated in Fig. 14. During this new position the plate $l^1$ has met the tappet $r'_1$ of the valve $v^1$ and brought it to the position indicated in Fig. 14.

As seen in this figure the liquid passes through the orifices $16^1$ and the channel 16 and acts on the corresponding face of the plate $2^1$. On the other hand the face of this plate is in communication with the interior by the channel 14, the orifices $14^1$ and $17''$ by means of the partitioning of the valve, the channel collector $S^1$ and the orifice S. Nothing now prevents the plate $2^1$ from occupying a reverse position, being that indicated in Fig. 11. The plate $2^1$ will thus be brought back to its initial position.

A complete cycle of movement is thus effected. The same pulsations will be produced indefinitely as long as the inlet and outlet orifices are open and the pressure of liquid sufficient to actuate these members.

Each pulsation of a plate is equal to the quantity of liquid passed, which quantity is indicated on the registering mechanism. This registering mechanism receives its movement from the plate $l^1$ by means of the lever $n^1$ fixed to said plate, the lever $p^1$ fixed to the rod $j$ and the lever 20 fixed to the other end of rod $j$.

The plates $1'$ and $2^1$ are provided with channels intended to facilitate the formation of a hydraulic joint during their oscillations. Rubber buffers 18 absorb the shock at the end of each stroke.

As can be seen from Figs. 1 and 2, the levers $p^1$ and $n^1$ oscillate in a space formed in the stopper $q^1$ and at the summit of the sector $f$. These levers do not affect the movements of said plate; further this space only communicates with a single face of the plates $1'$.

What I claim as my invention and desire to secure by Letters Patent of the United States is:—

A volmetric meter for liquids comprising a cylindrical casing, an inlet tube and an outlet tube for the liquid connected to said casing, two members each having the shape of a sector of a cylinder and comprising passages and channels for the flow of the liquid, fitted closely in said casing while leaving a cylindrical space between them co-axial with said casing, a sleeve provided with longitudinal openings and transverse apertures mounted centrally in said casing valves carried by said sleeve, plates adapted to be oscillated by the movement of the liquid, tappets carried by said valves and actuated by said plates to oscillate said valves, and lever mechanism actuated by one of said plates.

In witness whereof I have signed this specification in the presence of two witnesses.

BENJAMIN ADOLPHE ARNAUD.

Witnesses:
   JEAN GERMAIN.
   GNADR. CORBITT.